United States Patent
Murakami

(10) Patent No.: US 8,320,021 B2
(45) Date of Patent: Nov. 27, 2012

(54) IMAGE PROCESSING PERFORMING ERROR DIFFUSION BASED ON A COMBINATION OF HALF-TONE FREQUENCY AND ZOOM LEVEL

(75) Inventor: Yoshinori Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 419 days.

(21) Appl. No.: 12/623,312

(22) Filed: Nov. 20, 2009

(65) Prior Publication Data

US 2010/0128315 A1    May 27, 2010

(30) Foreign Application Priority Data

Nov. 21, 2008  (JP) ................................. 2008-298511

(51) Int. Cl.
*G06K 15/00* (2006.01)
*G06K 9/38* (2006.01)
(52) U.S. Cl. ...................................... 358/3.06; 382/270
(58) Field of Classification Search .................. None
See application file for complete search history.

(56) References Cited

U.S. PATENT DOCUMENTS 6,625,327 B1 * 9/2003 Ohshima et al. .............. 382/270
2007/0211913 A1 * 9/2007 Washio .......................... 382/100

FOREIGN PATENT DOCUMENTS

JP           9-247447 A       9/1997
JP           2007-243874      9/2007

* cited by examiner

*Primary Examiner* — Twyler Haskins
*Assistant Examiner* — Barbara Reinier
(74) *Attorney, Agent, or Firm* — Birch, Stewart, Kolasch & Birch, LLP

(57) ABSTRACT

When a halftone frequency inputted to a diffusion coefficient storage section is a low halftone frequency, or when the halftone frequency is a middle halftone frequency or high halftone frequency and a zoom level is a middle zoom level or high zoom level, the same set of diffusion coefficients are selected. Moreover, when the halftone frequency inputted to the diffusion coefficient storage section is the middle halftone frequency or high halftone frequency and the zoom level is the low zoom level, individual sets of diffusion coefficients are selected for respective current pixels. A diffusion error calculation section calculates diffusion errors to be diffused to respective not-quantized peripheral pixels of the current pixel, based on a quantization error inputted from a quantization error calculation section and the set of diffusion coefficients selected from the diffusion coefficient storage section.

8 Claims, 19 Drawing Sheets

F I G. 4

FREQUENCY CHARACTERISTIC / AMPLITUDE
SPECTRUM INTENSITY (G PLANE)

| 37952 | 1182 | 2389 | 1560 | 623 | 177 | 378 | 783 |
|---|---|---|---|---|---|---|---|
| 59 | 1773 | 3456 | 1252 | 886 | 555 | 547 | 447 |
| 735 | 2023 | 4129 | 1432 | 1053 | 670 | 565 | 589 |
| 1319 | 439 | 757 | 271 | 146 | 117 | 93 | 153 |
| 239 | 185 | 318 | 144 | 87 | 36 | 30 | 57 |
| 123 | 443 | 1005 | 312 | 324 | 98 | 171 | 151 |
| 332 | 125 | 217 | 132 | 56 | 74 | 34 | 56 |
| 295 | 108 | 128 | 52 | 54 | 38 | 41 | 28 |

FIG. 6

FREQUENCY CHARACTERISTIC / AMPLITUDE
SPECTRUM INTENSITY (G PLANE)

| 35390 | 70 | 86 | 154 | 124 | 410 | 390 | 193 |
|---|---|---|---|---|---|---|---|
| 127 | 88 | 110 | 142 | 36 | 30 | 30 | 47 |
| 58 | 75 | 148 | 369 | 43 | 43 | 23 | 68 |
| 588 | 682 | 1401 | 4429 | 761 | 407 | 327 | 377 |
| 130 | 43 | 80 | 433 | 120 | 60 | 38 | 37 |
| 195 | 76 | 27 | 331 | 40 | 62 | 23 | 90 |
| 692 | 132 | 96 | 325 | 76 | 81 | 92 | 47 |
| 174 | 78 | 77 | 291 | 14 | 61 | 35 | 47 |

FIG. 8

FREQUENCY CHARACTERISTIC / AMPLITUDE
SPECTRUM INTENSITY (G PLANE)

| 33687 | 47 | 70 | 126 | 264 | 142 | 207 | 310 |
|---|---|---|---|---|---|---|---|
| 47 | 35 | 56 | 38 | 321 | 50 | 55 | 53 |
| 15 | 53 | 3 | 204 | 385 | 30 | 82 | 65 |
| 36 | 59 | 95 | 202 | 697 | 152 | 146 | 49 |
| 26 | 140 | 242 | 819 | 3057 | 656 | 461 | 399 |
| 107 | 23 | 56 | 164 | 560 | 112 | 74 | 22 |
| 27 | 102 | 117 | 99 | 371 | 32 | 87 | 76 |
| 93 | 20 | 92 | 65 | 173 | 90 | 48 | 52 |

F I G. 1 1

| QUANTIZATION THRESHOLD | RANGE OF PIXEL VALUE | QUANTIZATION VALUE |
|---|---|---|
| 1 8 | 0~1 8 | 0 |
| 5 5 | 1 9~5 5 | 3 6 |
| 9 1 | 5 6~9 1 | 7 3 |
| 1 2 8 | 9 2~1 2 8 | 1 0 9 |
| 1 6 4 | 1 2 9~1 6 4 | 1 4 6 |
| 2 0 1 | 1 6 5~2 0 1 | 1 8 2 |
| 2 3 7 | 2 0 2~2 3 7 | 2 1 9 |
|  | 2 3 8~2 5 5 | 2 5 5 |

F I G. 1 2

| ZOOM LEVEL / HALFTONE FREQUENCY | LOW ZOOM LEVEL | MIDDLE ZOOM LEVEL | HIGH ZOOM LEVEL |
|---|---|---|---|
| LOW HALFTONE FREQUENCY | HALFTONE AREA1 | HALFTONE AREA1 | HALFTONE AREA1 |
| MIDDLE HALFTONE FREQUENCY | HALFTONE AREA2 | HALFTONE AREA1 | HALFTONE AREA1 |
| HIGH HALFTONE FREQUENCY | HALFTONE AREA2 | HALFTONE AREA1 | HALFTONE AREA1 |

FIG. 13

|  | * | 7/16 |
|---|---|---|
| 3/16 | 5/16 | 1/16 |

FIG. 14A

| | | * | 15/64 | 6/64 |
|---|---|---|---|---|
| 4/64 | 2/64 | 10/64 | 8/64 | 4/64 |
| 1/64 | 4/64 | 6/64 | 4/64 | 0/64 |

FIG. 14B

| | | * | 2/64 | 6/64 |
|---|---|---|---|---|
| 4/64 | 10/64 | 15/64 | 8/64 | 4/64 |
| 1/64 | 4/64 | 6/64 | 4/64 | 0/64 |

FIG. 14C

| | | * | 10/64 | 6/64 |
|---|---|---|---|---|
| 4/64 | 8/64 | 15/64 | 2/64 | 4/64 |
| 1/64 | 4/64 | 6/64 | 4/64 | 0/64 |

FIG. 14D

| | | * | 8/64 | 6/64 |
|---|---|---|---|---|
| 4/64 | 15/64 | 2/64 | 10/64 | 4/64 |
| 1/64 | 4/64 | 6/64 | 4/64 | 0/64 |

FIG. 16

| ZOOM LEVEL / HALFTONE FREQUENCY | LOW ZOOM LEVEL | MIDDLE ZOOM LEVEL | HIGH ZOOM LEVEL |
|---|---|---|---|
| LOW HALFTONE FREQUENCY | HALFTONE AREA1 | HALFTONE AREA1 | HALFTONE AREA1 |
| HIGH HALFTONE FREQUENCY | HALFTONE AREA2 | HALFTONE AREA1 | HALFTONE AREA1 |

FIG. 17

| HALFTONE FREQUENCY \ ZOOM LEVEL | LOW ZOOM LEVEL | HIGH ZOOM LEVEL |
|---|---|---|
| LOW HALFTONE FREQUENCY | HALFTONE AREA1 | HALFTONE AREA1 |
| MIDDLE HALFTONE FREQUENCY | HALFTONE AREA2 | HALFTONE AREA1 |
| HIGH HALFTONE FREQUENCY | HALFTONE AREA2 | HALFTONE AREA1 |

FIG. 18

| ZOOM LEVEL / HALFTONE FREQUENCY | LOW ZOOM LEVEL | HIGH ZOOM LEVEL |
|---|---|---|
| LOW HALFTONE FREQUENCY | HALFTONE AREA1 | HALFTONE AREA1 |
| HIGH HALFTONE FREQUENCY | HALFTONE AREA2 | HALFTONE AREA1 |

IMAGE PROCESSING PERFORMING ERROR DIFFUSION BASED ON A COMBINATION OF HALF-TONE FREQUENCY AND ZOOM LEVEL

CROSS-REFERENCE TO RELATED APPLICATION

This Nonprovisional application claims priority under 35 U.S.C. §119(a) on Patent Application No. 2008-298511 filed in Japan on Nov. 21, 2008, the entire contents of which are hereby incorporated by reference.

BACKGROUND

1. Technical Field

The present invention relates to an image processing apparatus which quantizes a pixel value of each of a plurality of pixels contained in an input image, based on a quantization threshold, performs a diffusion process of diffusing a quantization error generated by quantization to neighborhood pixels of each pixel, and generates an output image of halftone, an image forming apparatus provided with said image processing apparatus, a recording medium recording a computer program for realizing said image processing apparatus, and an image processing method.

2. Description of Related Art

In recent years, digitization of office automation equipments progresses rapidly, and demand of color image output increases, thereby an output device, such as a digital color copying machine of an electrophotographying system, a color printer of an inkjet system or a heat transfer system prevails widely. For example, an image inputted from an input device such as a digital camera or an image scanner, or an image created by a computer is outputted using such an output device. Generally, since the number of gray scales of an image which can be outputted by such an output device is fewer than the number of gray scales of an input image to be inputted from the input device, it is often the case that a pseudo-tone reproduction process is performed with respect to the input image.

There is an error diffusion process as one technique of the pseudo-tone reproduction process. The error diffusion process is a pseudo-halftone process of generating an output image reproduced with pseudo-halftone by lowering a gray scale of an input image, while maintaining the characteristic of the input image having a shade part. Moreover, an image processing method is proposed such that optimal output images are obtained with respect to input images of various conditions.

For example, the following image processing method is disclosed. In the method, a setting circuit is provided which sets up an error diffusion parameter according to at least one data of area data extracted from an inputted tone image, zoom level data, and average density data of pixels, and in the case of a reduction process, an error diffusion parameter for lowering density in a reproduction image is set up, and in the case of an enlargement process, a threshold and a limiter are adjusted so that an error may not occur as much as possible, or an error diffusion parameter is set up such that a simple binarization is performed without diffusing an error, thereby obtaining a reproduction image with high quality (refer to Japanese Patent Application Laid-Open No. H9-247447 (1997)).

SUMMARY

However, in the image processing method described in Japanese Patent Application Laid-Open No. H9-247447 (1997), although an average density and a zoom level of a halftone area are taken into consideration, a halftone frequency is not taken into consideration. Generally, a printed matter, such as a document, is printed using halftone of various halftone frequencies. In the case of reading such a document with a scanner etc., performing a zoom process and outputting an image with an image forming apparatus, such as an electrophotography system, an inkjet system, even when outputting the image with the same zoom level, blurriness condition or moire condition of halftone differs between a document with a high halftone frequency and a document with a low halftone frequency.

For example, when the zoom level is 100%, the blurriness of halftone is comparatively small in the case of halftone of 65 lpi (line/inch) and also in the case of halftone of 175 lpi. In the case of halftone of 65 lpi, even when performing the zoom process with 50% of the zoom level, the blurriness of halftone is comparatively small. However, when zooming the document having halftone of 175 lpi with 50% of the zoom level, the blurriness occurs so that a pattern of halftone cannot be determined, thereby obtaining an image like a continuous tone image. Then, even when performing the error diffusion process with respect to such an image using a diffusion coefficient suitable for a halftone image or a halftone area, the obtained image is similar to an image obtained in the case where the error diffusion process is performed with respect to a continuous tone image or a continuous tone area, thereby arising a problem that the graininess thereof lowers remarkably.

The present invention has been made with the aim of solving the above problems, and it is an object of the invention to provide an image processing apparatus which can control lowering of the graininess according to a zoom level or halftone frequency, and can obtain a high-quality image, an image forming apparatus provided with said image processing apparatus, a recording medium recording a computer program for realizing said image processing apparatus, and an image processing method.

An image processing apparatus according to the present invention is an image processing apparatus which quantizes a pixel value of each of a plurality of pixels contained in an input image, based on a quantization threshold, performs an error diffusion process of diffusing a quantization error generated by quantization to a neighborhood pixel of each pixel, and generates an output image of halftone, comprising: a storage section for storing a plurality of sets of diffusion coefficients for the error diffusion process; a halftone frequency obtaining section for obtaining a halftone frequency based on a pixel value of an input image; a zoom process section for zooming the input image with a required zoom level; and a process section for selecting one set of diffusion coefficients from the sets of diffusion coefficients stored in said storage section, according to the halftone frequency obtained by said halftone frequency obtaining section and the zoom level with which the input image is zoomed by said zoom process section, and performing the error diffusion process based on the selected set of diffusion coefficients and the quantization error.

An image processing apparatus according to the present invention is characterized in that the process section: classifies the halftone frequency obtained by said halftone frequency obtaining section, based on a predetermined halftone frequency threshold; classifies the zoom level of the input image zoomed by said zoom process section, based on a predetermined zoom level threshold; and selects a set of diffusion coefficients according to a combination of classification results.

An image processing apparatus according to the present invention is characterized in that said process section: classifies the halftone frequency into a low halftone frequency, middle halftone frequency, or high halftone frequency, and classifies the zoom level into a low zoom level, middle zoom level, or high zoom level; and selects an individual set of diffusion coefficients for each pixel, when the halftone frequency is classified into the middle halftone frequency or high halftone frequency and the zoom level is classified into the low zoom level.

An image processing apparatus according to the present invention is characterized in that said process section: classifies the halftone frequency into a low halftone frequency, middle halftone frequency, or high halftone frequency, and classifies the zoom level into a low zoom level, middle zoom level, or high zoom level; and selects the same set of diffusion coefficients for each pixel, when the halftone frequency is classified into the low halftone frequency, or when the halftone frequency is classified into the middle halftone frequency or high halftone frequency and the zoom level is classified into the middle zoom level or high zoom level.

An image processing apparatus according to the present invention is characterized by further comprising an area determination section for determining whether the pixel belongs to at least any one of a text area, halftone area, or photograph area, based on the pixel value of the input image, wherein said process section selects a set of diffusion coefficients according to a determination result by said area determination section.

An image forming apparatus according to the present invention is an image forming apparatus, comprising: the image processing apparatus according to the above invention; and an image forming section for forming an output image generated by said image processing apparatus on a sheet.

A recording medium according to the present invention is a recording medium readable by a computer and recording a computer program for causing a computer to quantize a pixel value of each of a plurality of pixels contained in an input image, based on a quantization threshold, perform an error diffusion process of diffusing a quantization error generated by quantization to a neighborhood pixel of each pixel, and generate an output image of halftone, said computer program comprising: a step of causing a computer to obtain a halftone frequency based on a pixel value of the input image; a step of causing the computer to zoom the input image with a required zoom level; and a step of causing the computer to determine a set of diffusion coefficients for the error diffusion process according to the obtained halftone frequency and the zoom level with which the input image is zoomed, and perform the error diffusion process based on the determined set of diffusion coefficients and the quantization error.

An image processing method according to the present invention is an image processing method for an image processing apparatus which quantizes a pixel value of each of a plurality of pixels contained in an input image, based on a quantization threshold, performs an error diffusion process of diffusing a quantization error generated by quantization to a neighborhood pixel of each pixel, and generates an output image of halftone, the method comprising: storing a plurality of sets of diffusion coefficients for the error diffusion process; obtaining a halftone frequency based on a pixel value of an input image; zooming the input image with a required zoom level; and selecting one set of diffusion coefficients from the stored sets of diffusion coefficients according to the obtained halftone frequency and the zoom level with which the input image is zoomed, and performing the error diffusion process based on the selected set of diffusion coefficients and the quantization error.

In the present invention, when quantizing a pixel value of each of a plurality of pixels (current pixels) contained in an input image using a quantization threshold and performing the error diffusion process of diffusing a quantization error generated by quantization to a neighborhood pixel of the current pixel using a set of diffusion coefficients, a set of diffusion coefficients are selected according to a halftone frequency obtained based on the pixel value of input image and a zoom level with which the input image is zoomed. For this reason, in consideration of not only the zoom level of the zoom process performed with respect to the input image but also the halftone frequency of input image, the error diffusion process can be performed using optimal diffusion coefficients. Then, according to a degree of the halftone frequency and a degree of the zoom level, the diffusion coefficients suitable for reproduction of halftone are used, and the diffusion coefficients suitable for reproduction of a continuous tone image are used for an area in which halftone of the input image has blurred, thereby preventing an image quality deterioration of a halftone area, and controlling lowering of graininess thereof.

In the present invention, the obtained halftone frequency is classified into at least the low halftone frequency or high halftone frequency based on a predetermined halftone frequency threshold, the zoom level with which the input image is zoomed is classified into at least the low zoom level or high zoom level based on a predetermined zoom level threshold, and a set of diffusion coefficients are selected according to a combination of both classification results. For example, the halftone frequency of 100 lpi or less can be classified into the low halftone frequency, the halftone frequency in the range of 101 to 199 lpi can be classified into the middle halftone frequency, and the halftone frequency of 200 lpi or more can be classified into the high halftone frequency. Moreover, the zoom level of 50% or less can be classified into the low zoom level, the zoom level of more than 50% and 150% or less can be classified into the middle zoom level, and the zoom level of more than 150% can be classified into the high zoom level. Note that the middle halftone frequency and middle zoom level may be omitted. Thereby, the degree of halftone frequency and the degree of zoom level can be classified simply, and the error diffusion process can be performed using optimal diffusion coefficients according to the classifications.

In the present invention, when the halftone frequency is classified into the middle halftone frequency or high halftone frequency and the zoom level is classified into the low zoom level (this classification is called the halftone area 2), an individual set of diffusion coefficients are selected for each pixel (each current pixel). For example, the individual set of diffusion coefficients are determined beforehand corresponding to a random number generated by a random number generator, and the set of diffusion coefficients are selected at random according to the random number generated by the random number generator for each current pixel. When the diffusion coefficients are selected (switched) at random for each current pixel, a ratio of errors accumulated from the respective quantized pixels varies, as compared with a case where the diffusion coefficients are fixed. Similarly, when the diffusion coefficients are selected based on the individual random number for each color component, a ratio of errors accumulated from the respective quantized pixels for each color component varies. For this reason, since a tone degree (quantization value) of an output image also varies, in an image (area) where the halftone frequency is the middle halftone frequency or high halftone frequency and the halftone has blurred due to the zoom process with the low zoom level, for example, the continuous dot-printing in a portion with a high pixel value can be controlled, an overlap of excessive dots can be controlled, thereby controlling an image quality deterioration of a halftone area, and controlling lowering of graininess thereof.

In the present invention, when the halftone frequency is classified into the low halftone frequency or when the halftone frequency is classified into the middle halftone frequency or high halftone frequency and the zoom level is classified into the middle zoom level or a high zoom level (these classification are called the halftone area 1), the same set of diffusion coefficients are selected for each pixel. Since a ratio of the errors accumulated from the respective quantized pixels is constant by fixing the set of diffusion coefficients, as compared with a case where the set of diffusion coefficients are switched at random for each pixel, the dot-printing in a portion with a low pixel value of halftone in the input image can be controlled, and the dot-printing can be performed in a portion with a high pixel value of the halftone, thereby controlling an image quality deterioration of the halftone area, and controlling lowering of graininess thereof.

In the present invention, based on a pixel value of the input image, it is determined whether the current pixel belongs to at least one of a text area, a halftone area, or a photograph area, and the set of diffusion coefficients are selected according to the determination result. For example, when the current pixel is determined as the halftone area, the diffusion coefficients are selected according to the halftone frequency and zoom level. Therefore, only an area determined as the halftone area can be processed using the diffusion coefficients according to the halftone frequency and zoom level, thereby reducing the processing effort, and shortening the processing time.

In the present invention, since the image forming apparatus comprises the above-mentioned image processing apparatus according to the present invention, lowering of graininess can be controlled according to the zoom level and halftone frequency, and a high-quality image can be formed on a sheet.

According to the present invention, lowering of graininess can be controlled according to the zoom level and halftone frequency, and a high-quality image can be obtained.

The above and further objects and features will more fully be apparent from the following detailed description with accompanying drawings.

BRIEF DESCRIPTION OF THE SEVERAL VIEWS OF THE DRAWINGS

FIG. 4 is an explanatory view showing a numerical example of amplitude spectrum intensities in the case of 85 lpi;

FIG. 6 is an explanatory view showing a numerical example of amplitude spectrum intensities in the case of 150 lpi;

FIG. 8 is an explanatory view showing a numerical example of amplitude spectrum intensities in the case of 200 lpi;

FIG. 11 is a diagram showing an example of quantization;

FIG. 12 is a diagram showing an example of classification by a halftone frequency and a zoom level;

FIG. 13 shows an example of a set of diffusion coefficients used in a halftone area 1;

FIGS. 14A to 14D show examples of sets of diffusion coefficients used in a halftone area 2, respectively;

FIG. 16 is a diagram showing another example of classification by a halftone frequency and a zoom level;

FIG. 17 is a diagram showing another example of classification by a halftone frequency and a zoom level;

FIG. 18 is a diagram showing another example of classification by a halftone frequency and a zoom level.

DETAILED DESCRIPTION

Figure 1:
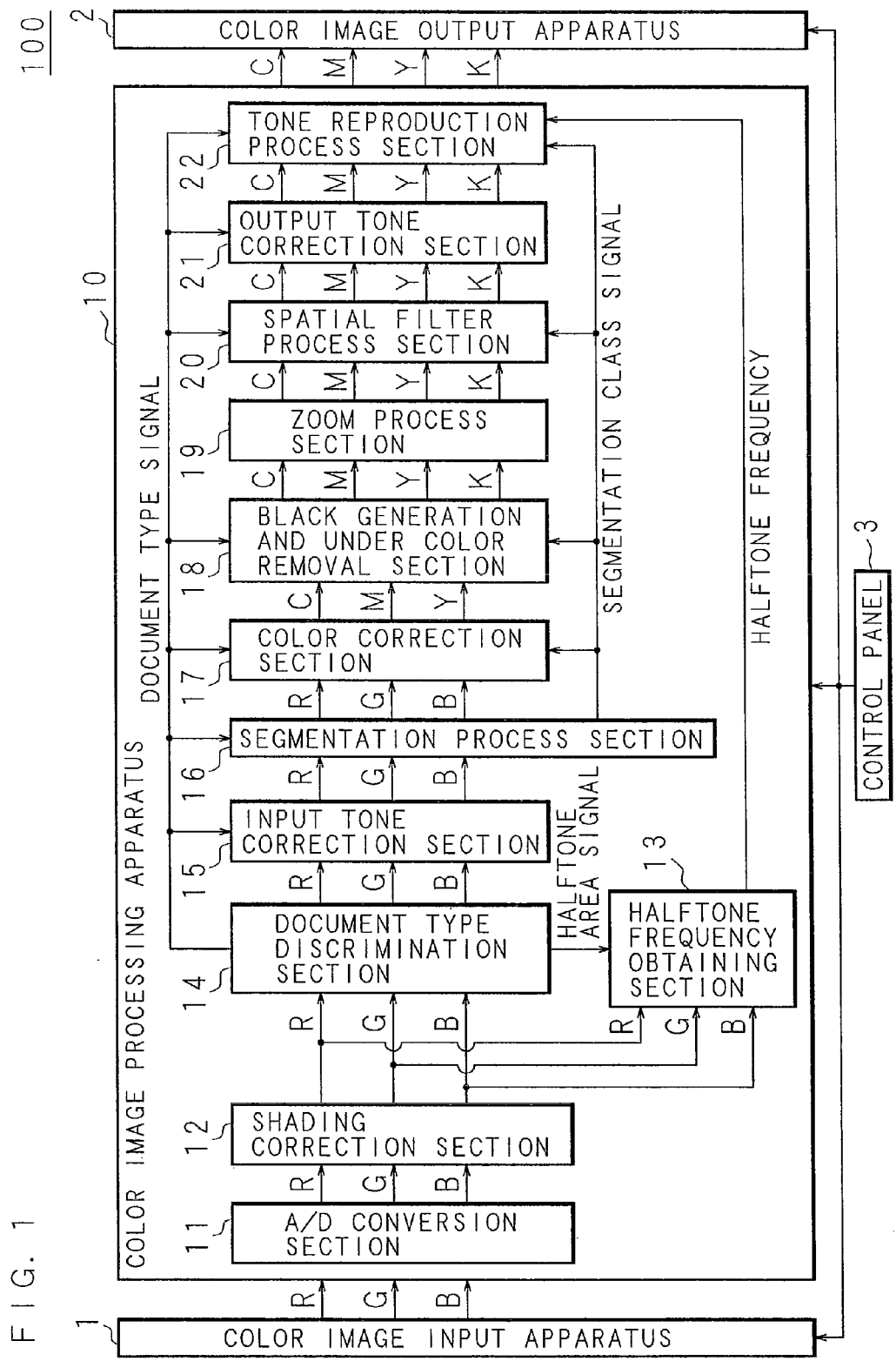
FIG. 1 is a block diagram showing a structure of an image forming apparatus provided with an image processing apparatus according to the present invention.

The following will explain the present invention based on the drawings showing an embodiment thereof. FIG. 1 is a block diagram showing a structure of an image forming apparatus 100 provided with an image processing apparatus according to the present invention. The image forming apparatus 100 (for example, a digital color copying machine, and a multi-function peripheral provided with a copy function, a printer function, facsimile and an E-mail distribution function) comprises a color image input apparatus 1 as an image reading device, a color image processing apparatus 10 as an image processing apparatus, a color image output apparatus 2 as image forming means, and a control panel 3 for performing various operations, and the like. The image data having analog signals of RGB (R: red, G: green, B: blue) obtained by reading a document with the color image input apparatus 1 is outputted to the color image processing apparatus 10, is subjected to a predetermined process by the color image processing apparatus 10, and is outputted to the color image output apparatus 2 as digital color signals of CMYK (C: cyan, M: magenta, Y: yellow, K: black).

The color image input apparatus 1 comprises a scanner section provided with a CCD (Charged Coupled Device), for example, reads an optical image reflected from a document as RGB analog signals with the CCD, and outputs the read RGB signals to the color image processing apparatus 10. The color image output apparatus 2 is image forming means using an electrophotography system or an inkjet system, etc. for outputting image data of a document on a sheet of record paper. The color image output apparatus 2 may be a displaying device, such as a display.

As shown in FIG. 1, the color image processing apparatus 10 comprises an A/D convertion section 11, a shading correction section 12, a halftone frequency obtaining section 13, a document type discrimination section 14, an input tone correction section 15, a segmentation process section 16, a color correction section 17, a black generation and under color removal section 18, a zoom process section 19, a spatial filter process section 20, an output tone correction section 21, a tone reproduction process section 22, and the like.

The A/D convertion section 11 converts the RGB signals inputted from the color image input apparatus 1 into digital signals of the predetermined number of bits, and outputs the converted RGB signals to the shading correction section 12.

The shading correction section 12 performs a compensation process of removing various kinds of distortions caused by a lighting system, focusing system, image sensing system, etc. of the color image input apparatus 1 from the inputted RGB digital signals. Also, the shading correction section 12 adjusts the color balance thereof.

The document type discrimination section 14 converts the RGB signals (RGB reflectivity signal) in which the various kinds of distortions are removed by the shading correction section 12, into signals such as density signals which are easy to process in the color image processing apparatuses 10. Also, the document type discrimination section 14 discriminates a type of a document whether or not an input image (an image of a document) is an image of a text document, printed-picture document, photograph document, text/printed-picture document, or text/photograph document. Note that the text/printed-picture document and text/photograph document are combined with the text document and any one of the printed-picture document or photograph document, respectively.

The document type discrimination section 14 outputs a document type signal showing a type of an input image (an image of a document) to the input tone correction section 15, segmentation process section 16, color correction section 17, black generation and under color removal section 18, spatial filter process section 20, output tone correction section 21, and tone reproduction process section 22. Also, the document type discrimination section 14 outputs a halftone area signal showing a halftone area to the halftone frequency obtaining section 13, based on a discrimination result of a document type. Details of a method for discriminating a document type are mentioned later.

The halftone frequency obtaining section 13 calculates (obtains) a halftone frequency in a halftone area discriminated by the document type discrimination section 14. Note that when a user manually selects or sets a document type on the control panel 3, the selected or set document type may be preferentially processed by the halftone frequency obtaining section 13, or the document type selected or set on the control panel 3 may be compared with the document type discriminated by the document type discrimination section 14, thereby using one of the document types. Details of a method for calculating a halftone frequency are mentioned later.

The input tone correction section 15 performs an image quality adjustment process, such as removal of a page background density or contrast, and outputs the processed RGB signals to the segmentation processing section 16.

The segmentation process section 16 (area determination section) determines, based on the inputted RGB signals, whether or not respective pixels in the input image belong to any of, for example, a page background area, a text area, a halftone area, and a photograph area, respectively, thereby performing a segmentation process. Based on a determination result (segmentation result), the segmentation process section 16 outputs a segmentation class signal showing an area to which each pixel belongs, to the color correction section 17, black generation and under color removal section 18, spatial filter process section 20, and tone reproduction process section 22. Also, the segmentation process section 16 outputs the inputted RGB signals to the latter color correction section 17 without any modification. Details of the segmentation process are mentioned later.

The color correction section 17 performs a process of removing color impurity based on the spectral characteristics of CMY color materials containing unnecessary absorption components, in order to reproduce colors precisely. For such a process, there are a method of previously storing correspondence relation between RGB signals on input side and CMY signals on output side as a LUT (look up table), and a color masking method using a conversion matrix which converts values of (R, G, B) into values of (C, M, Y), and the like.

For example, in a case where the color masking method is used, a color patch with the same L* a* b* value (CIE1976L* a* b* signal (CIE:Commission International de l'Eclairage; International Commission on Illumination, and L*:Lightness, a*, b*:Chrominance)) as L* a* b* value of a color outputted when certain CMY data is given to the color image output apparatus 2, is read by the color image input apparatus 1, many sets of RGB data at a time of reading the color patch and CMY data given to the color image output apparatus 2 are prepared, and respective coefficients of the above-mentioned conversion matrix are calculated from a combination of the RGB data and CMY data, and a color correction process is performs using the calculated coefficient. A term of higher order equal to or more than second order can be added so as to improve precision furthermore.

The black generation and under color removal section 18 generates a K (black) signal based on the CMY signals inputted from the color correction section 17, subtracts the K signal from the inputted CMY signals of three colors to generate new CMY signals, and outputs the generated CMYK signals of four colors to the zoom process section 19.

One example of the process by the black generation and under color removal section 18 is shown below. For example, in the case of generating black with skeleton black, when the input-output characteristic of a skeleton curve is set to y=f(x), data to be inputted is set to C, M, and Y, data to be outputted is set to C', M', Y', and K', and a UCR (Under Color Removal) rate is set to a $(0 \leq \alpha \leq 1)$, data to be outputted by the black generation and under color removal process is expressed as the following equations. K'=f {min (C, M, Y)}, C'=C−αK', M'=M−αK', and Y'=Y−αK'

The zoom process section 19 performs an enlargement process or reduction process of the input image, based on a signal inputted on the control panel 3 by a user's operation. As a zoom process, a process according to interpolating calculation may be performed in a main scanning direction and a sub scanning direction, or a process may be performed optically in the sub scanning direction and the process according to the interpolating calculation may be performed only in the main scanning direction. Note that although a zoom level of 50% or less can be classified into a low zoom level, a zoom level of more than 50% and 150% or less can be classified into a middle zoom level, and a zoom level of more than 150% can be classified into a high zoom level, concrete values are not limited to these.

The spatial filter process section 20 performs a spatial filter process on the CMYK signals inputted from the zoom process section 19 by a digital filter based on the segmentation class signal. Thereby, the spatial frequency characteristic of image data is corrected, and a blurriness or granular deterioration of the output image in the color image output apparatus 2 is prevented. Note that the tone reproduction process section 22 also performs the same process as that of the spatial filter process section 20 with respect to the image data having the CMYK signals based on the segmentation class signal.

The output tone correction section 21 performs an output tone correction process of converting the CMYK signals inputted from the spatial filter process section 20 into a halftone area rate which is a characteristic value of the color image output apparatus 2, and outputs the CMYK signals obtained after the output tone correction process to the tone reproduction process section 22.

The tone reproduction process section 22 performs a tone reproduction process (halftone generation) on the image data of CMYK signals inputted from the output tone correction section 21, based on the segmentation class signal, so that the image can be reproduced with a pseudo gray scale eventually. Details of the tone reproduction process are mentioned later.

The processes of the spatial filter process section 20 and the tone reproduction process section 22 are explained. For example, with respect to an area segmented into a text area by the segmentation process section 16, a high frequency component thereof is enhanced (sharpened) with an edge enhancement process in the spatial filter process by the spatial filter process section 20 in order to improve the reproducibility of a black text or a color text, especially. Simultaneously, in the tone reproduction process section 22, a binarization process or a multi-level process in a high resolution screen suitable for reproduction of the high frequency component is selected.

Moreover, the spatial filter process section 20 performs a low pass filter process for removing an input halftone component from an area segmented into the halftone area by the segmentation process section 16. Also, the tone reproduction process section 22 performs the tone reproduction process (halftone generation) so as to segment an image into pixels and reproduce gray scales thereof. However, the low pass filter process is performed in order to control moire generated when performing a periodic process such as dithering based on image data with a periodic constant property by halftone of a document. When performing the error diffusion process etc. which are not the periodic process such as dithering in the tone reproduction process, the low pass filter process for removing a halftone component is not performed, in order to reproduce a halftone component as much as possible, the spatial filter process is not performed (forbidden), or the high frequency component thereof is enhanced by the edge enhancement process.

With respect to an area segmented into the photograph area by the segmentation process section 16, the binarization process or the multi-level process in a screen focused on tone reproduction is performed.

The control panel 3 comprises a touch panel including a display part, such as a liquid crystal display, and an operation part, such as a setting button, as a unit, for example. Based on information inputted from the control panel 3, operations of the color image input apparatus 1, color image processing apparatus 10, and color image output apparatus 2 are controlled. Note that the above processes are controlled by a CPU (Central Processing Unit).

The color image processing apparatus 10 once stores image data (CMYK signals) processed by the tone reproduction process section 22 in a storage section (not-shown), reads the image data stored in the storage section on a predetermined timing of performing image formation, and outputs the read image data to the color image output apparatus 2. Note that the color image output apparatus 2 outputs an image on a recording medium (for example, paper etc.), and is a color image output apparatus of an electrophotographic system or an inkjet system, etc., but it is not limited to these.

Next, the segmentation process is explained. In the segmentation process, for example, a maximum density difference which is a difference between a minimum density value (minimum pixel value) and a maximum density value (maximum pixel value) in a block consisting of n×m pixels (for example, 15×15) containing a current pixel is calculated, and also, a total density busyness which is total of absolute values of respective density differences between adjacent pixels is calculated, the calculated maximum density difference and total density busyness are compared with a plurality of predefined thresholds, respectively, thereby each pixel is segmented into a page background area, photograph area (continuous tone area), text area, or halftone area.

Since the page background area usually has a density distribution with little density change, both of a maximum density difference and total density busyness are dramatically small. Since the photograph area has a density distribution with a smooth density change, both of a maximum density difference and total density busyness are small, but are large as compared with those of the page background area. In the halftone area, a maximum density difference varies according to halftone, and since a density changes in response to the number of halftone dots, a rate of the total density busyness to the maximum density difference is large. Therefore, when the total density busyness is larger than a product of the maximum density difference and a text/halftone determination threshold, the pixel is determined as the halftone area. In the text area, a maximum density difference is large, and therefore a total density busyness is also large, but a density change is less than that of the halftone area, thereby the total density busyness is smaller than that of the halftone area. Therefore, when the total density busyness is smaller than a product of the maximum density difference and a text/halftone determination threshold, the pixel is determined as the text area.

The calculated maximum density difference is compared with a maximum density difference threshold, the calculated total density busyness is compared with a total density busyness threshold. When the maximum density difference is smaller than the maximum density difference threshold and the total density busyness is smaller than the total density busyness threshold, the current pixel is determined as a page-background/photograph area, and otherwise it is determined as a text/halftone area. When the pixel is determined as the page-background/photograph area, the calculated maximum density difference is compared with a page-background/photograph determination threshold. When the maximum density difference is smaller, the pixel is determined as a page background area, and when the maximum density difference is larger, the pixel is determined as a photograph area. When the pixel is determined as a text/halftone area, the calculated total density busyness is compared with an integrated value of the maximum density difference and a text/halftone determination threshold. When the total density busyness is smaller, the pixel is determined as the text area and when the total density busyness is larger, the pixel is determined as the halftone area.

Next, the method for discriminating a document type is explained. In this method, a minimum density value and a maximum density value in a block consisting of n×m pixels containing a current pixel, for example, are calculated. Then, the maximum density difference is calculated using the calculated minimum density value and maximum density value, and the total density busyness which is total of absolute values of respective density differences between adjacent pixels is calculated. Then, the calculated maximum density difference is compared with the maximum density difference threshold, and the calculated total density busyness is compared with the total density busyness threshold.

Then, when the condition of maximum density difference<maximum density difference threshold and the condition of total density busyness<total density busyness threshold are satisfied, the current pixel is determined as a page-background/photographic-paper area, and when the above conditions are not satisfied, the current pixel is determined as a text/halftone area. In the page-background/photographic-paper area, when the condition of the maximum density difference<page-background/photographic-paper determination threshold is satisfied, the current pixel is determined as a page background area, otherwise it is determined as a photographic-paper area. In the text/halftone area, when the condition of the total density busyness<maximum density difference×text/halftone dot determination threshold is satisfied, the current pixel is determined as a text area, otherwise it is determined as a halftone area.

Then, the number of the determined pixels is calculated for each area, and the calculated numbers are compared with predetermined thresholds for the page background area, photographic-paper area, halftone area, and text area, respectively, thereby discriminating a document type. For example, when a ratio of the text area and a ratio of the halftone area are equal to or greater than the thresholds, respectively, the document type can be discriminated as a text/halftone document (text/printed-picture document). For example, in a case where a detection accuracy is high in order of a text, a halftone, and a photograph, when a ratio of the text area is not less than 30% of the number of total pixels, the document can be discriminated as a text document. When a ratio of the halftone area is not less than 20% of the number of total pixels, the document can be discriminated as a halftone document (printed-picture document). Moreover, when a ratio of the photograph area is not less than 10% of the number of total pixels, the document can be discriminated as a photograph document. Note that in the method for discriminating a document type, pre-scan may be performed, or image data which was once stored in storage means of a hard disk etc. may be used.

Figure 2:
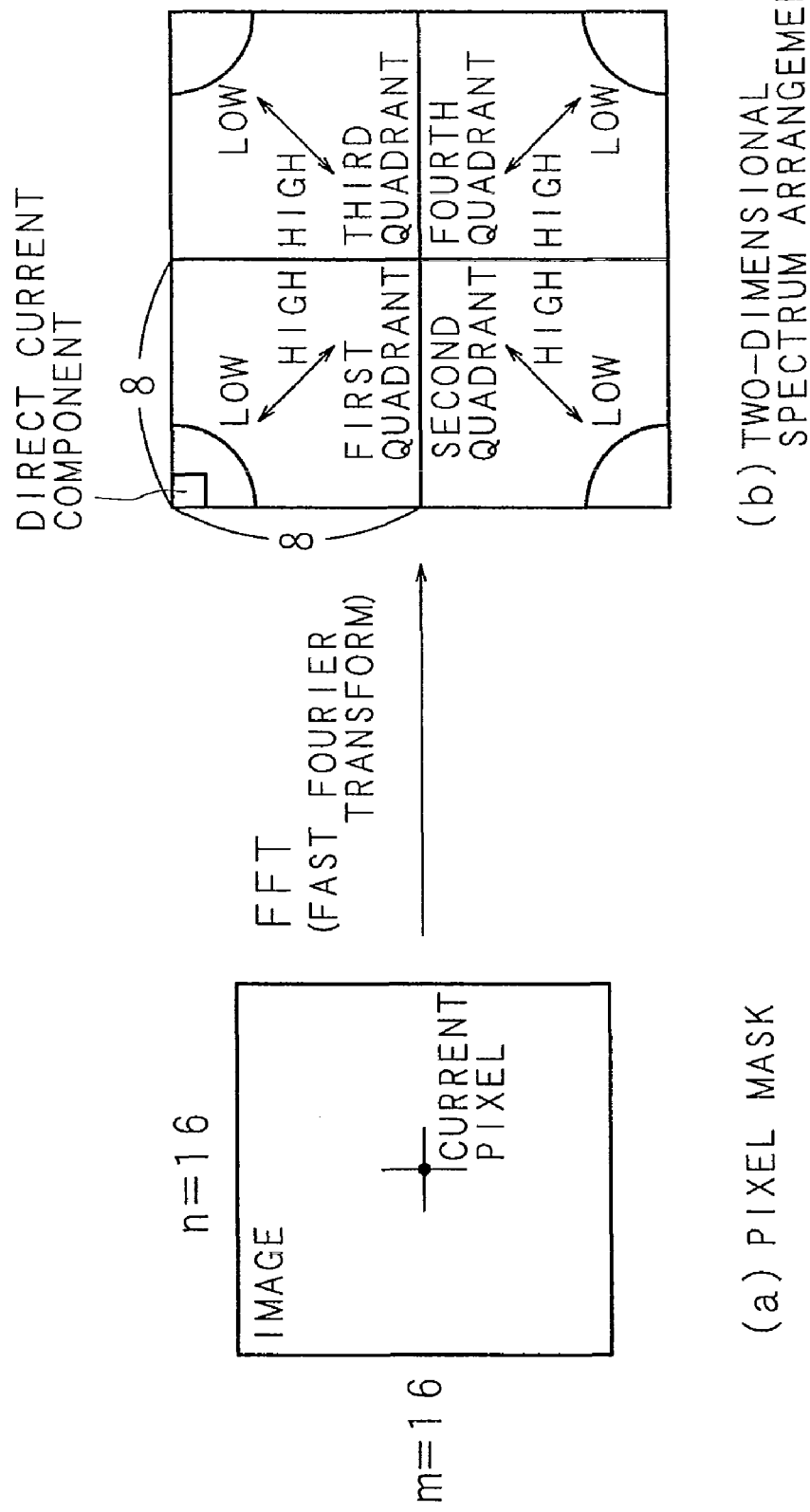
FIG. 2 is an explanatory view showing an example of arrangement of frequency components of an image.

Next, the method for calculating (obtaining) of a halftone frequency is explained. FIG. 2 is an explanatory view showing an example of arrangement of frequency components of an image. (a) of FIG. 2 shows an example of a pixel mask consisting of m×n pixels centered on arbitrary current pixel of an input image, for example, and (b) of FIG. 2 shows arrangement of components in a frequency area obtained after performing FFT (Fast Fourier Transform) as frequency-analysis process with respect to the pixel mask. As a size of the pixel mask, 2 to the k-th power is usually set to m and n, to use the FFT. In an example of (a) of FIG. 2, as k=4, 16 is set to m and n. Then, the FFT process is performed with respect to the pixel mask cut out from the input image.

As shown in (b) of FIG. 2, by the FFT process, a real space area is converted into a frequency area, thereby obtaining two-dimensional spectrum arrangement. The equation (1) can be used as a conversion equation for the FFT process. In this case, the real space area is set to (x, y), the frequency area is set to (u, v), the input image (pixel mask) is set to I (x, y), and an amplitude spectrum intensity is set to F (u, v).

$$F(u,v) = \iint I(x,y) e^{-j2\pi(ux+vy)} dx dy \quad (1)$$

The frequency characteristic can be obtained for each of the above pixel masks by using an amplitude spectrum intensity of the Fast Fourier Transform. As shown in (b) of FIG. 2, the two-dimensional spectrum arrangement consists of four quadrants of the first quadrant to the fourth quadrant each including a frequency area (u, v) of 8×8. An upper left rectangular portion expresses a direct current component. In the first quadrant, low-frequency components are changed to high-frequency component from the upper left toward the lower right.

Figure 3:
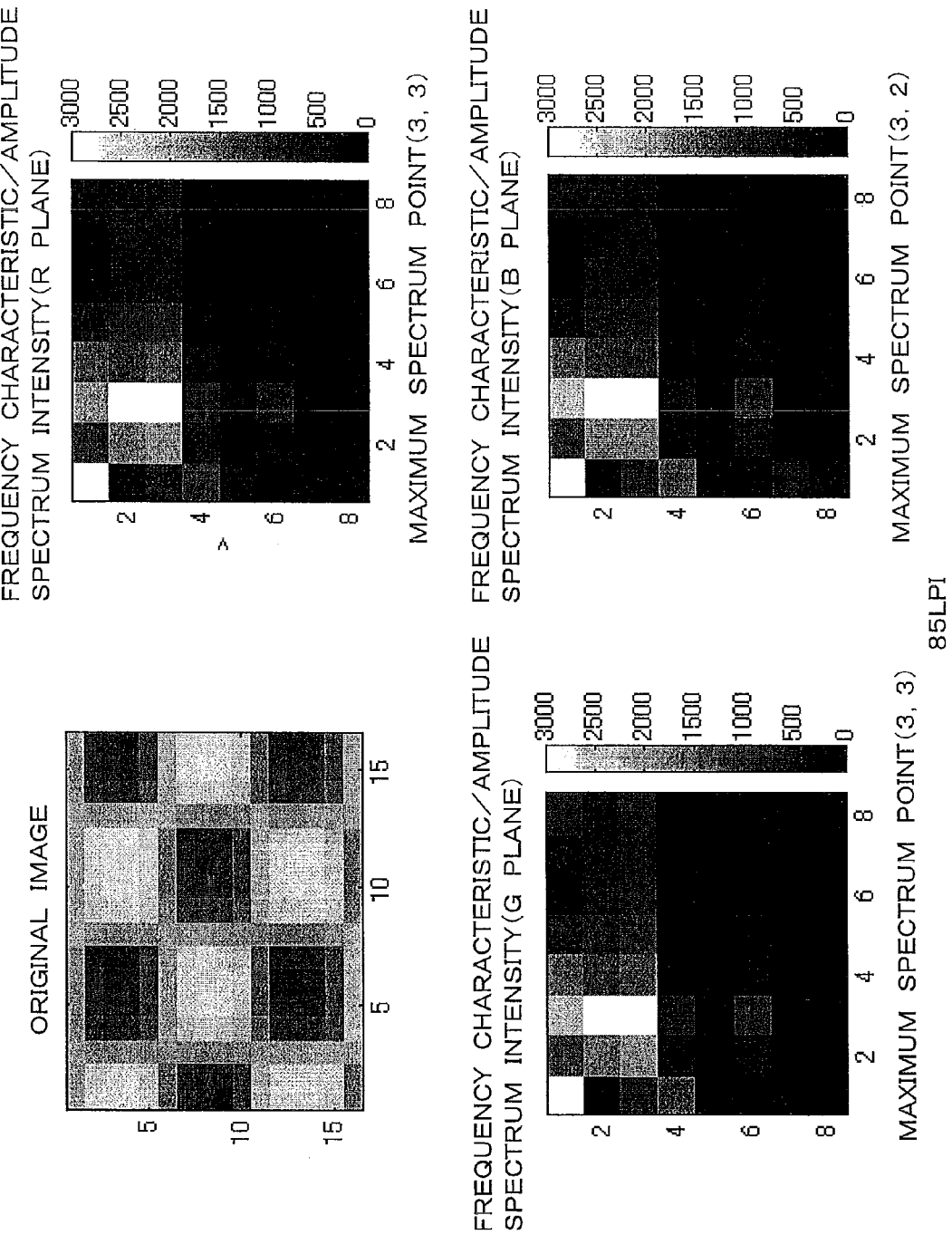
FIG. 3 is an explanatory view showing an example of an FFT process result in the case of 85 lpi (line/inch)
Figure 5:
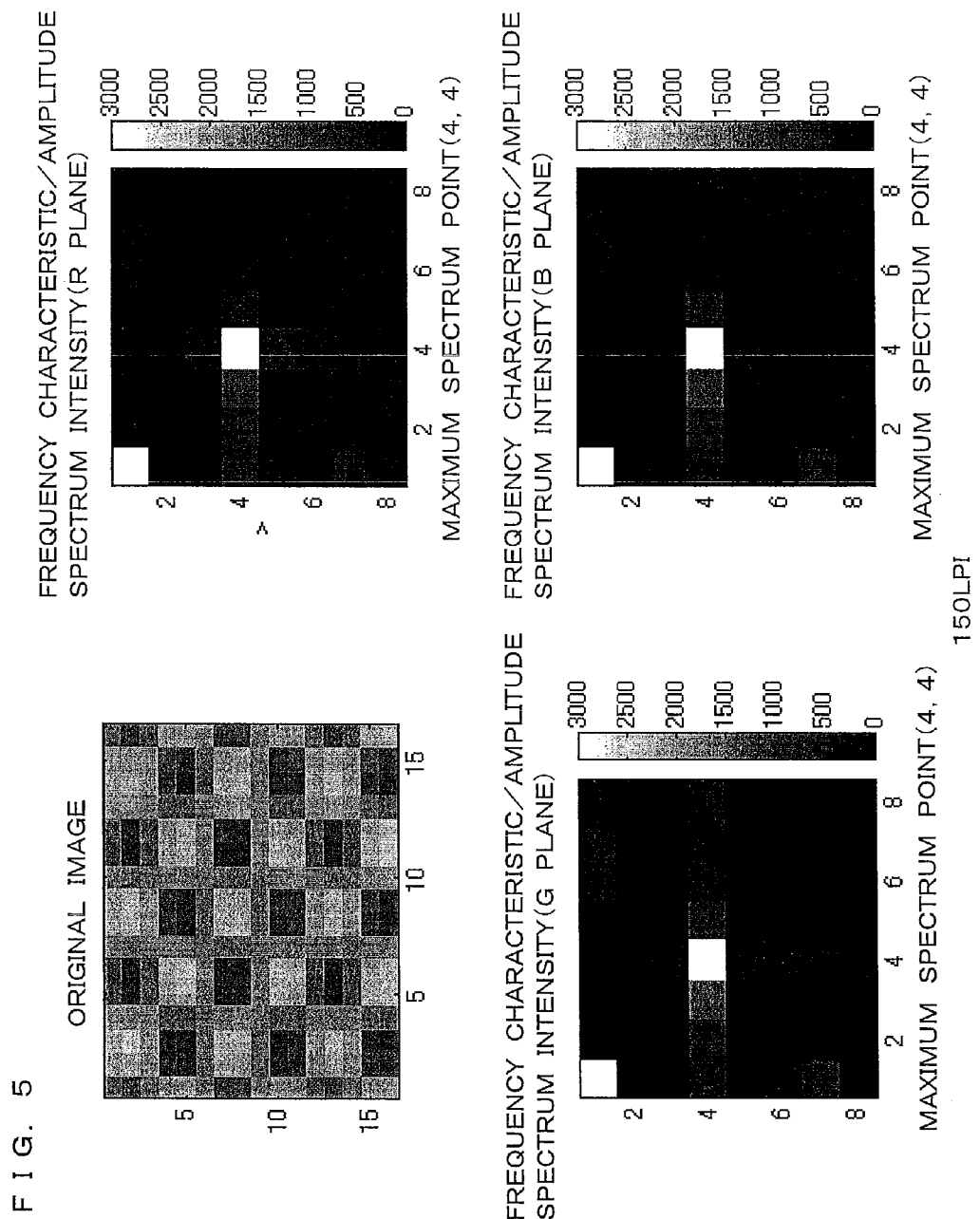
FIG. 5 is an explanatory view showing an example of an FFT process result in the case of 150 lpi.
Figure 7:
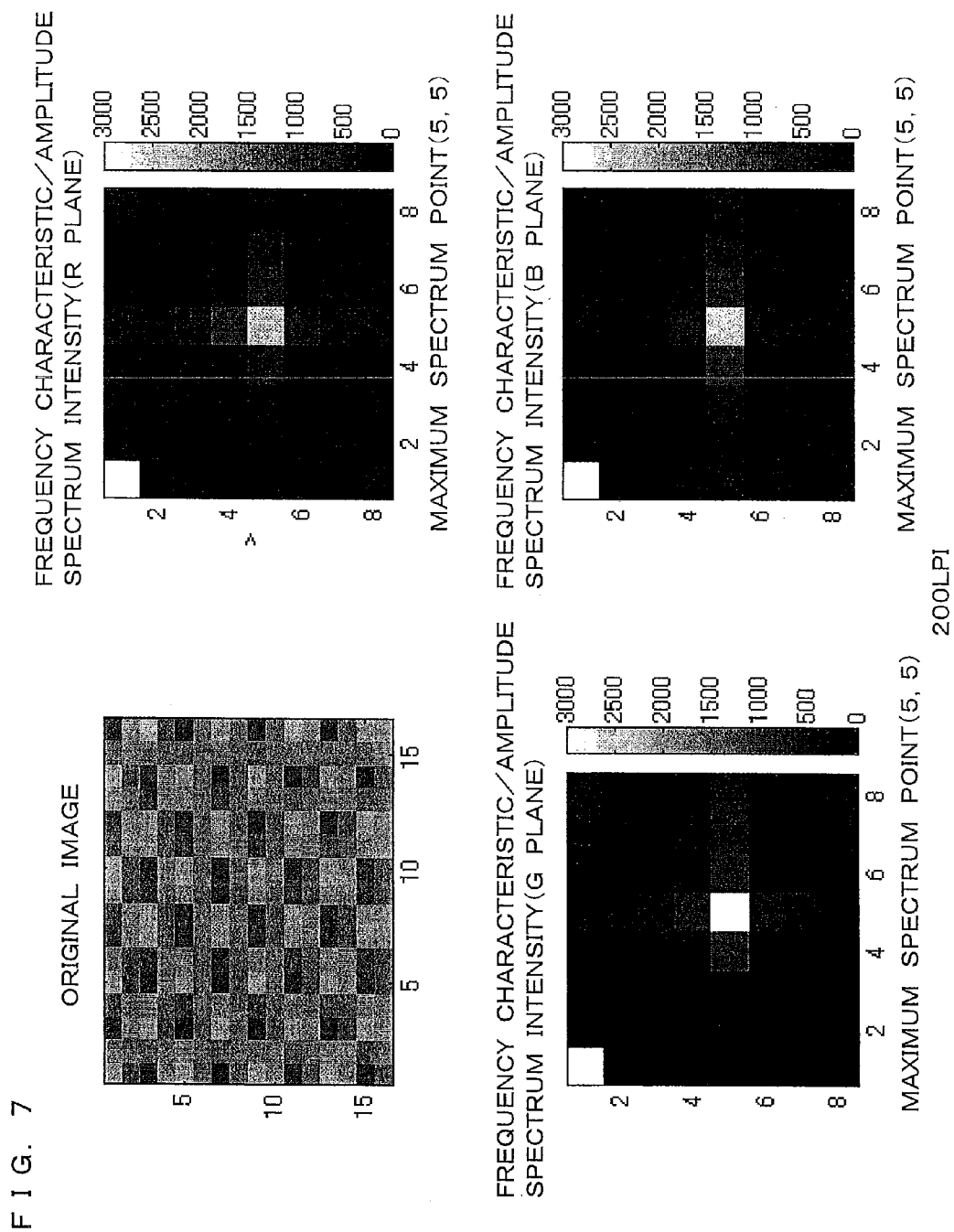
FIG. 7 is an explanatory view showing an example of an FFT process result in the case of 200 lpi.

Next, an FFT process result of an image having a typical halftone frequency is explained. FIG. 3 is an explanatory diagram showing an example of an FFT process result in the case of 85 lpi (line/inch), and FIG. 4 is an explanatory diagram showing a numerical example of amplitude spectrum intensities in the case of 85 lpi. FIG. 5 is an explanatory diagram showing an example of an FFT process result in the case of 150 lpi, and FIG. 6 is an explanatory diagram showing a numerical example of amplitude spectrum intensities in the case of 150 lpi. FIG. 7 is an explanatory diagram showing an example of an FFT process result in the case of 200 lpi, and FIG. 8 is an explanatory diagram showing a numerical example of amplitude spectrum intensities in the case of 200 lpi. In FIGS. 3, 5 and 7, upper left diagrams show original images, and upper right diagrams, lower left diagrams, and lower right diagrams show distributions of the frequency characteristics (amplitude spectrum intensities) of R plane (red component), G plane (green component), and B plane (blue component) with respect to each of the original images, respectively.

In the frequency characteristic of each color component, a horizontal axis is u (u=1-8), and a vertical axis is v (v=1-8), and the amplitude spectrum intensity is shown by a difference between the color components. Upper left portions (u=v=1) in the diagrams show direct current components, respectively. The low-frequency components are changed to the high-frequency components in a direction where u and v increase, i.e., from the upper left toward the lower right. FIGS. 4, 6 and 8 show sizes (amplitude spectrum intensities) of frequency components corresponding to u, v=1, 2, 8, respectively.

For example, as shown in FIG. 3, in the case of 85 lpi, with the frequency characteristic of R plane, a maximum spectrum point at which an amplitude spectrum is the maximum exists in (u, v)=(3, 3). With the frequency characteristic of G plane, a maximum spectrum point at which an amplitude spectrum is the maximum exists in (u, v)=(3, 3). With the frequency characteristic of B plane, a maximum spectrum point at which an amplitude spectrum is the maximum exists in (u, v)=(3, 2).

As shown in FIG. 5, in the case of 150 lpi, with the frequency characteristics of R plane, G plane, and B plane, maximum spectrum points at which amplitude spectrums are the maximum exist in (u, v)=(4, 4), respectively.

As shown in FIG. 7, in the case of 200 lpi, with the frequency characteristics of R plane, G plane, and B plane, maximum spectrum points at which amplitude spectrums are the maximum exist in (u, v)=(5, 5), respectively.

Thus, the amplitude spectrum intensities are concentrated near the upper left with respect to a low halftone frequency (for example, 85 lpi), and are concentrated near the lower right with respect to a high halftone frequency (for example, 200 lpi). The reason is why the halftone with the low halftone frequency is constructed by the halftone containing many low-frequency components, and the halftone with the high halftone frequency is constructed by the halftone containing many high frequency components. Therefore, by obtaining the frequency characteristic of an area detected as halftone, and calculating the frequency component contained in the halftone, the halftone frequency can be obtained.

Figure 9:
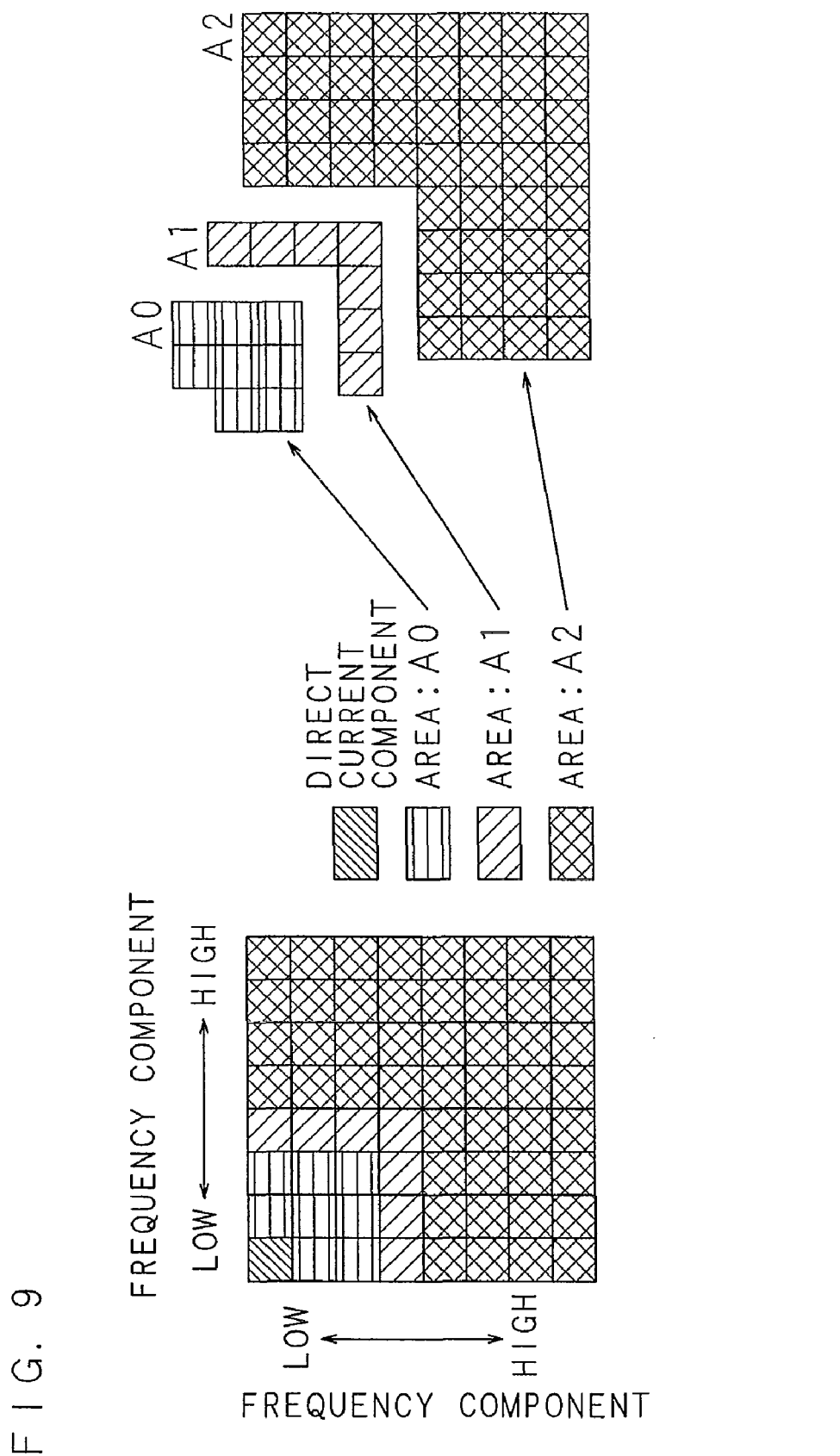
FIG. 9 is an explanatory view showing a method for determining a halftone frequency by the frequency characteristic.

FIG. 9 is an explanatory diagram showing a method for determining the halftone frequency by the frequency characteristics. As mentioned above, the halftone frequency can be determined according to a distribution state of the frequency characteristic in a frequency area with respect to the original image. As shown in FIG. 9, the frequency area is classified into three areas A0, A1, and A2 except an area of the direct current component. The area A0 is a frequency area of 3×3 except an area of the direct current component, on the side of low frequency components. The area A1 is adjacent to the area A0, and is an L-shaped area, and the area A2 is the remaining area except the areas A0, A1, on the side of high frequency components.

The amplitude spectrum intensities are added up for each area A0-A2, the added values are normalized by dividing by the number of the pixels contained in each area A0-A2, respectively, and whether halftone frequency is high or low is determined according to whether the maximum value of the normalized values is included in which area. When the maximum value is included in the area A0, the halftone frequency is determined as a low halftone frequency, when the maximum value is included in the area A1, it is determined as a middle halftone frequency, and when the maximum value is included in the area A2, it is determined as a high halftone frequency.

In this case, the halftone frequency of 100 lpi or less is set (classified) to the low halftone frequency, and corresponds to an image obtained from a document, such as a newspaper, telephone book, and flier. The halftone frequency of 101 lpi or more and 199 lpi or less is set (classified) to the middle halftone frequency, and corresponds to an image obtained from a general printed matter, or the like. Moreover, the halftone frequency of 200 lpi or more is set (classified) to the high halftone frequency, and corresponds to an image obtained from a document, such as a photograph collection and catalog (of quality articles).

Figure 10:
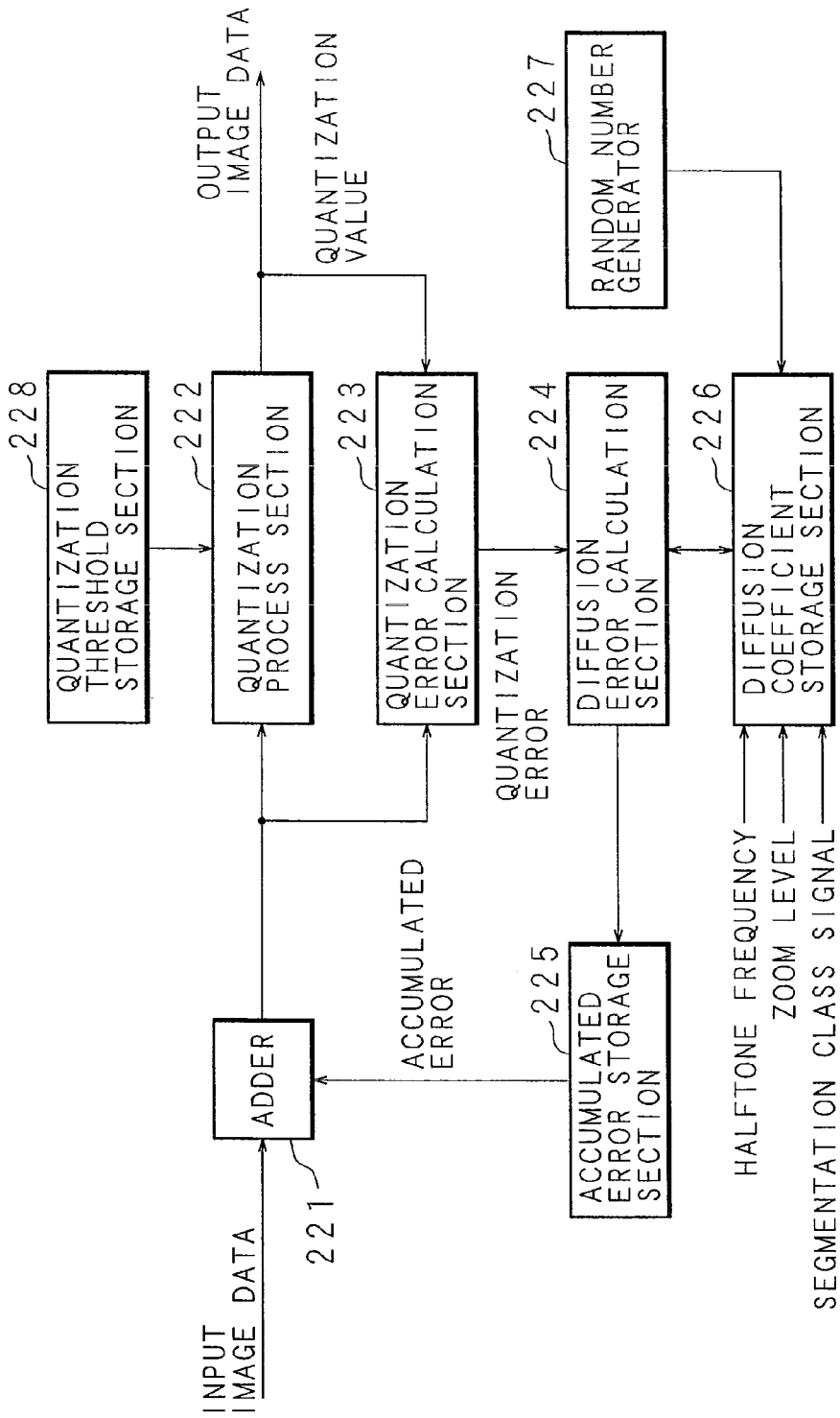
FIG. 10 is a block diagram showing a structure of a tone reproduction process section.

Next, the tone reproduction process in the tone reproduction process section 22 is explained. FIG. 10 is a block diagram showing the structure of the tone reproduction process section 22. The tone reproduction process section 22 includes an adder 221, a quantization process section 222 having a comparator, a quantization error calculation section 223 having a subtracter, a diffusion error calculation section 224 having a multiplier, an accumulated error storage section 225 which is composed of a RAM (Random Access Memory), a diffusion coefficient storage section 226 which is composed of a ROM (Read Only Memory), a random number generator 227, a quantization threshold storage section 228 which is composed of a ROM, and the like. The tone reproduction process section 22 scans a current pixel (pixel to be processed) of an input image which is consisted of input image data in a predetermined direction, and performs a predetermined process for each scanned current pixel.

Each of pixels of image data to be inputted into the tone reproduction process section 22 is consisted of four color components of CMYK, and halftone generation using the error diffusion process is performed for each color component. For this reason, the error diffusion process can be performed in order using a common circuit for respective color components, or the error diffusion process can be performed in parallel using the respective circuits for respective color components of CMYK. Note that since the error diffusion processes for respective color components are performed similarly, the following explains about a process of one color component, and explains about only the different point in the processes of the other color components.

The adder 221 adds an accumulated error (diffusion error) corresponding to a position of a current pixel obtained from the accumulated error storage section 225 to a pixel value (density value) of the current pixel, and outputs a pixel value to which the accumulated error is added to the quantization process section 222 and quantization error calculation section 223.

The quantization process section 222 quantizes by comparing the inputted pixel value (pixel value to which the accumulated error is added) with a quantization threshold stored in the quantization threshold storage section 228, and outputs the quantized value as output image data. Moreover, the quantization process section 222 outputs the quantized value to the quantization error calculation section 223.

FIG. 11 is an explanatory diagram showing an example of quantization. For example, when the number of gray scales of an input image is 0 to 255, and the quantization thresholds are set to 18, 55, 91, 128, 164, 201, and 237. Based on the quantization thresholds, the number of gray scales of the input image (0 to 255) is quantized to eight quantization values (for example, 0, 36, 73, 109, 146, 182, 219, 255).

When the number of gray scales of respective pixels of the input image is 256 gray scales of 0 to 255, for example, by setting the quantization thresholds to 18, 55, 91, 128, 164, 201, and 237, the number of gray scales can be quantized to eight quantization values 0, 36, 73, 109, 146, 182, 219, and 255. As shown in FIG. 11, when a pixel value is 0, since the quantization threshold is 18 or less, the quantization value is set to 0. When the pixel value (density value) is in the range of 19 to 55, the quantization value is set to 36. Similarly, a quantization value can be obtained according to a pixel value of each pixel.

When the quantization value is 0, a gray scale of an output image is 0, i.e., without output, dot-printing is not performed. As a quantization value becomes higher, a gray scale of output image becomes higher.

The quantization error calculation section 223 calculates an error (quantization error) between the quantization value inputted from the quantization process section 222 and the pixel value inputted from the adder 221, and outputs the calculated quantization error to the diffusion error calculation section 224.

The diffusion error calculation section 224 calculates diffusion errors to be diffused to not-quantized peripheral pixels of the current pixel, based on the quantization error inputted from the quantization error calculation section 223, and respective diffusion coefficients (a set of diffusion coefficients) of an error diffusion matrix obtained from the diffusion coefficient storage section 226. The diffusion error calculation section 224 stores the calculated diffusion errors in the accumulated error storage section 225.

A plurality of sets of diffusion coefficients (a plurality of error diffusion matrixes) are stored in the diffusion coefficient storage section 226, and a set of diffusion coefficients to be used by the diffusion error calculation section 224 are selected according to the halftone frequency, segmentation class signal, zoom level, and a random number which is generated by the random number generator 227 for each pixel (current pixel).

In the present embodiment, the tone reproduction process section 22 classifies the halftone frequency obtained by the halftone frequency obtaining section 13 into a low halftone frequency, a middle halftone frequency, or a high halftone frequency based on a predetermined halftone frequency threshold, classifies a zoom level with which an input image is zoomed by the zoom process section 19 into a low zoom level, a middle zoom level, or a high zoom level based on a predetermined zoom level threshold, and selects a set of diffusion coefficients according to a combination of both of classification results.

FIG. 12 is an explanatory diagram showing an example of classification by a halftone frequency and zoom level. As shown in FIG. 12, for example, the halftone frequency of 100 lpi or less can be classified into the low halftone frequency, the halftone frequency in the range of 101 to 199 lpi can be classified into the middle halftone frequency, and the halftone frequency of 200 lpi or more can be classified into the high halftone frequency. Moreover, the zoom level of 50% or less can be classified into the low zoom level, the zoom level of more than 50% and 150% or less can be classified into the middle zoom level, and the zoom level of more than 150% can be classified into the high zoom level.

Then, a case where the halftone frequency is classified into the low halftone frequency, or a case where the halftone frequency is classified into the middle halftone frequency or high halftone frequency and the zoom level is classified into the middle zoom level or the high zoom level, is summarized as one classification and this classification is called a halftone area 1. Also, a case where the halftone frequency is classified into the middle halftone frequency or high halftone frequency and the zoom level is classified into the low zoom level, is summarized as one classification, and this classification is called a halftone area 2. Thereby, the degree of the halftone frequency and the degree of the zoom level can be classified simply, and the error diffusion process can be performed using an optimal diffusion coefficient according to the classification.

Then, when the halftone frequency and zoom level which are inputted into the diffusion coefficient storage section 226 belong to the halftone area 1, that is, when the halftone frequency is the low halftone frequency, or when the halftone frequency is the middle halftone frequency or high halftone frequency and the zoom level is the middle zoom level or high zoom level, the same set of diffusion coefficients are selected, even if a current pixel is changed.

Figure 13:
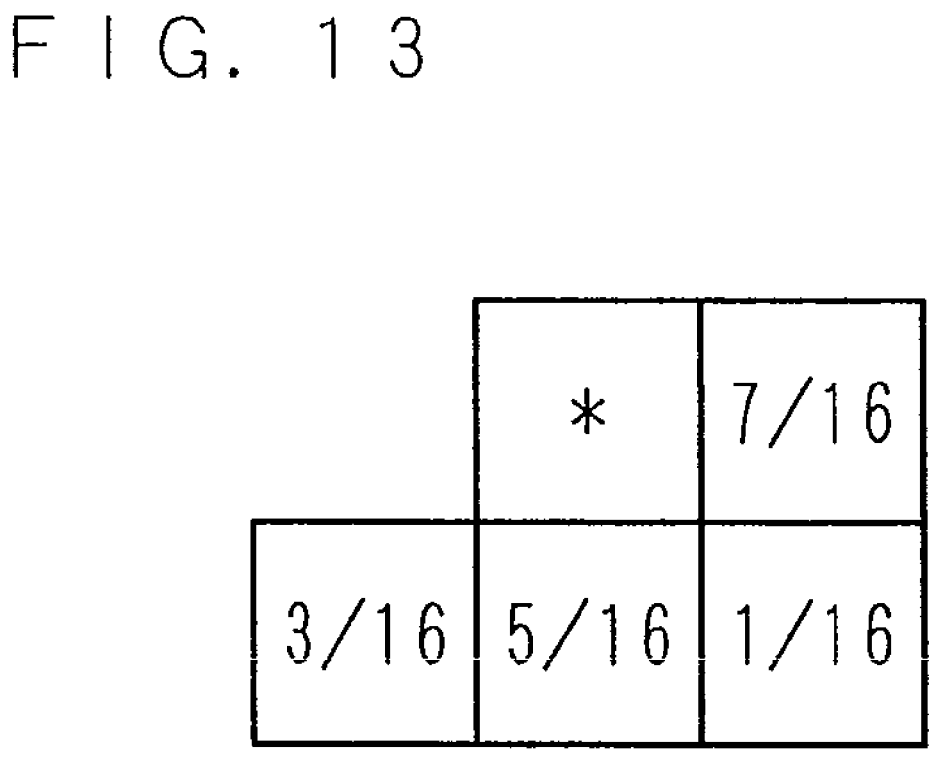

FIG. 13 shows an example of a set of the diffusion coefficients used in the halftone area 1. The set of diffusion coefficients, i.e. the error diffusion matrix includes respective diffusion coefficients of $7/16$, $3/16$, $5/16$, and $1/16$ corresponding to respective positions of a right pixel (pixel to be scanned next), a lower left pixel, a pixel directly below the current pixel (* symbol in FIG. 13), and a lower right pixel (each pixel which is in a line next to a current line with the current pixel) with respect to the current pixel, for example. Therefore, as the quantization error with respect to the current pixel, values for the quantization error of $7/16$, $3/16$, $5/16$, and $1/16$ are diffuse to the right pixel, the lower left pixel, the pixel directly below the current pixel, and the lower right pixel, respectively.

By fixing the set of diffusion coefficients without changing them for each current pixel, a ratio of errors accumulated from the respective quantized pixels is constant as compared with a case where the set of diffusion coefficients are switched at random for each pixel. Therefore, dot-printing in a portion with a low pixel value of halftone in an input image is controlled, the dot-printing can be performed in a portion with a high pixel value of the halftone, thereby controlling an image quality deterioration of a halftone area, and lowering of graininess thereof.

When the halftone frequency and zoom level which are inputted into the diffusion coefficient storage section 226 belong to the halftone area 2, i.e., when the halftone frequency is the middle halftone frequency or high halftone frequency and the zoom level is the low zoom level, the various set of diffusion coefficients are selected for each pixel (each current pixel).

FIGS. 14A to 14D shows examples of sets of diffusion coefficients used in the halftone area 2, respectively. The set of diffusion coefficients, i.e., the error diffusion matrix includes respective diffusion coefficients corresponding to respective positions of two pixels adjacent to the current pixel (* symbol in FIGS. 14A to 14D) on right side, four pixels in two lines on lower left side, two pixels in two lines directly below the current pixel, and four pixels in two lines on lower right side, with respect to the current pixel, for example. Note that the diffusion coefficients have individual values, as shown in FIGS. 14A to 14D. Therefore, as the quantization error with respect to the current pixel, the diffusion coefficients are diffused to a total of 12 pixels of the two pixels adjacent to the current pixel on right side, four pixels in two lines on lower left side, two pixels in two lines directly below the current pixel, and four pixels in two lines on lower right side, respectively. In this case, for example, the sets of diffusion coefficients shown in FIGS. 14A to 14D are beforehand determined corresponding to the random numbers (for example, 2 bits, 0 to 3) generated by the random number generator 227, respectively, and the set of diffusion coefficients are selected at random according to the random number generated by the random number generator 227 for each current pixel.

Moreover, by providing the random number generator 227 for each color component, a random number can be generated for each random number generator, or a random number for each color component can be generated from one random number generator. Thereby, the individual set of diffusion coefficients can be selected for each color component.

When the diffusion coefficients are selected (switched) at random for each current pixel, a ratio of errors accumulated from the respective quantized pixels is changed as compared with a case where the diffusion coefficients are fixed. Similarly, when the diffusion coefficients are selected by the individual random number for each color component, a ratio of errors accumulated from the respective quantized pixels for each color component is changed. For this reason, since a tone degree (quantization value) of an output image is also changed, in an image (area) where the halftone frequency is the middle halftone frequency or high halftone frequency and the halftone has blurred due to the zoom process with the low zoom level, for example, the continuous dot-printing in a portion with high pixel values can be controlled, and an overlap of excessive dots can be controlled, thereby controlling an image quality deterioration in a halftone area, and lowering of graininess thereof.

A halftone frequency threshold for classification of halftone frequencies and a zoom level threshold for classification of zoom levels can be set beforehand as follows. Namely, images obtained after performing the zoom process on halftone document images of various halftone frequencies are displayed on a display etc. or printed, and then it is checked whether or not each of the images has blurred to the extent that halftone is not recognized in the case of what zoom level, thereby setting the thresholds. Alternatively, some halftone document images are processed using the some different sets of diffusion coefficients corresponding to the zoom levels, and then it is checked whether or not an image quality or graininess of an output image processed using which set of diffusion coefficients is satisfactory for what zoom level, and thereby setting the thresholds.

Moreover, a set of diffusion coefficients can be selected according to a segmentation class signal (a determination signal of segmentation) from the segmentation process section 16. For example, when the current pixel is determined as the halftone area, a set of diffusion coefficients are selected according to the halftone frequency and zoom level, and according to whether the current pixel belongs to the halftone area 1 or the halftone area 2. Therefore, only an area determined as the halftone area can be processed using the diffusion coefficients according to the halftone frequency and zoom level, thereby reducing a processing effort, and shortening a processing time.

Moreover, when the current pixel is determined as the photograph area, the same set of diffusion coefficients as those in the case of the halftone area 2 are selected, and the error diffusion is performed in the same manner as the case of the halftone area 2.

Moreover, when the current pixel is determined as the text area, an another set of diffusion coefficients can be used, or the same set of diffusion coefficients as those in the case of the halftone area 1 can be selected. In this case, the error diffusion of a pixel belonging to the text area is processed in the same manner as the case of the halftone area 1. Also, when the current pixel is determined as the page background area, an another set of diffusion coefficients may be used, or the same set of diffusion coefficients as those in the case of the halftone area 2 can be selected. In this case, the error diffusion of a pixel belonging to the page background area is performed in the same manner as the case of the halftone area 2.

Figure 15:
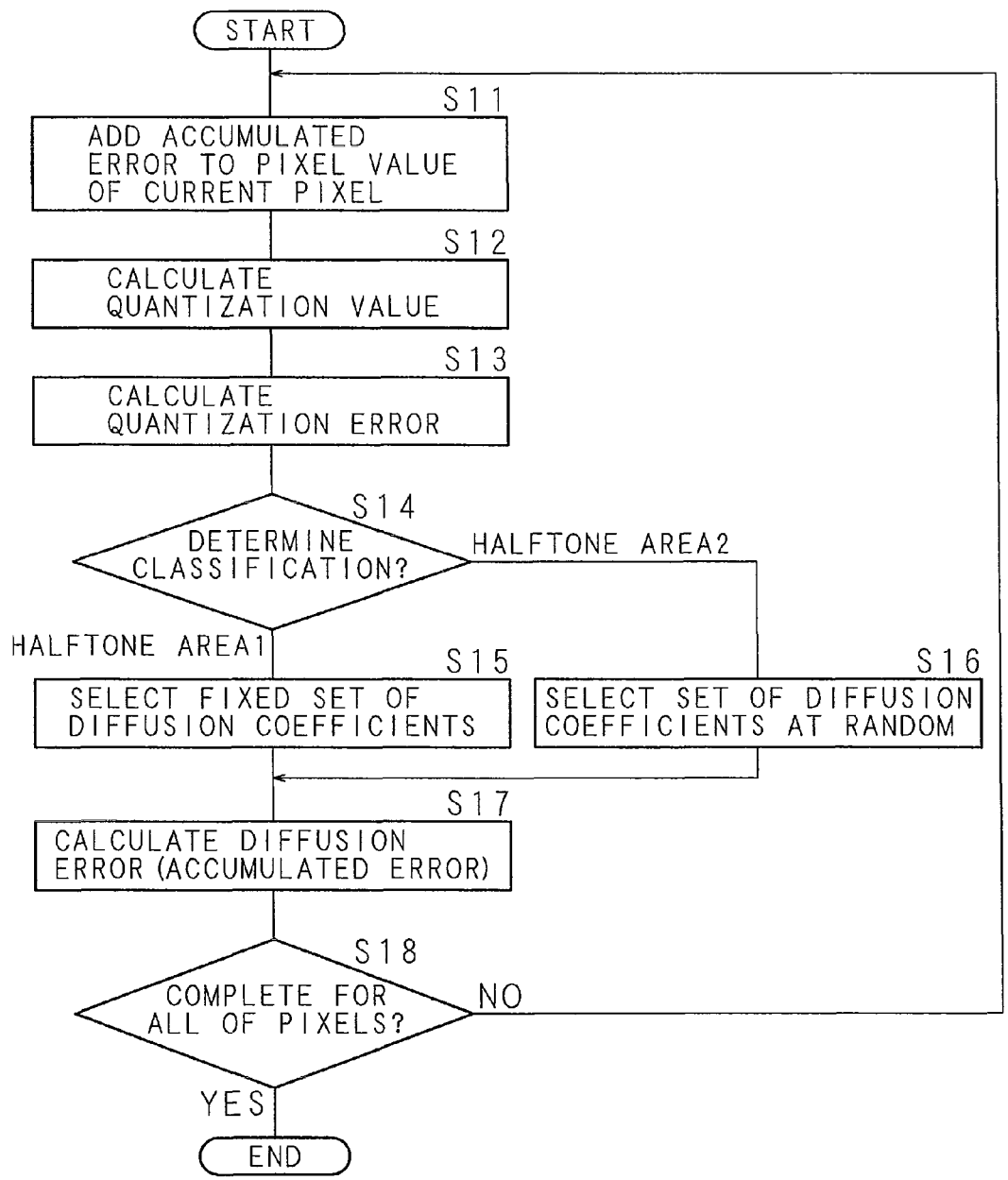
FIG. 15 is a flow chart showing a procedure of an error diffusion process of the tone reproduction process section.

Next, the following explains an operation of the color image processing apparatus 10. FIG. 15 is a flow chart showing a procedure of the error diffusion process by the tone reproduction process section 22 (hereafter, process section 22). Note that the error diffusion process is not only performed in a dedicated hardware circuit, but also can be performed by loading a computer program including the procedure of the error diffusion process into a personal computer provided with CPU, RAM, ROM, etc., and executing the computer program with the CPU.

The process section 22 scans each pixel of an input image in a predetermined direction, and adds an accumulated error (diffusion error) corresponding to a position of a current pixel to a pixel value (density value) of the current pixel (S11). The process section 22 calculates a quantization value of the current pixel using a quantization threshold (S12).

The process section 22 calculates a quantization error which is a difference between the pixel value of the current pixel and the quantization value (S13). The process section 22 determines that the current pixel belongs to which area of classification (S14), and when the current pixel is determined as the halftone area 1 (the halftone area 1 at Step S14), the process section 22 selects a fixed (constant) set of diffusion coefficients (error diffusion matrix) (S15).

On the other hand, when the current pixel is determined as the halftone area 2 (the halftone area 2 at Step S14), the process section 22 selects a set of diffusion coefficients (error diffusion matrix) at random (S16). In this case, in place of the halftone area 2, and a continuous tone area such as the photograph area can also be included.

The process section 22 calculates diffusion errors (accumulated error) to be diffused to respective not-quantized peripheral pixels of the current pixel, based on the calculated quantization error and the selected set of diffusion coefficients (S17). The process section 22 judges whether the process is completed or not for all of the pixels (S18), and when the process is not completed (NO at S18), the process after Step S11 is continued, and when the process for all of the pixels is completed (YES at S18), the process is ended.

Although in the above-mentioned embodiment, the error diffusion process is performed using the segmentation result, not the segmentation result but a discrimination result of a document type can also be used. In this case, the photograph document may be classified in the same manner as the cases of the halftone areas 1 and 2 according to the halftone frequency and zoom level.

Note that although the above-mentioned explanation shows an example where the halftone frequency is classified into the low halftone frequency, middle halftone frequency, or high halftone frequency, for simplification, the halftone frequency may be classified into two kinds of the low halftone frequency and high halftone frequency. Moreover, for simplification, the zoom level of an input image may be also classified into two kinds of the low zoom level and high zoom level.

FIG. 16 is an explanatory diagram showing another example of classification by the halftone frequency and zoom level. The example of FIG. 16 shows a case where the halftone frequency is classified into the low halftone frequency or high halftone frequency. As shown in FIG. 16, when the halftone frequency is the low halftone frequency, or when the zoom level is the middle zoom level or high zoom level irrespective of the halftone frequency, even if the current pixel is changed, the same set of diffusion coefficients (diffusion coefficients with respect to the halftone area 1) may be selected, and when the halftone frequency is the high halftone frequency and the zoom level is the low zoom level, an individual set of diffusion coefficients (diffusion coefficients with respect to the halftone area 2) may be selected for each pixel (each current pixel).

FIG. 17 is an explanatory diagram showing another example of classification by the halftone frequency and zoom level. The example in FIG. 17 shows a case where the zoom level is classified into the low zoom level or high zoom level. As shown in FIG. 17, when the halftone frequency is the low halftone frequency, or when the halftone frequency is the middle halftone frequency or high halftone frequency and the zoom level is the high zoom level, even if the current pixel is changed, the same set of diffusion coefficients may be selected, and when the halftone frequency is the middle halftone frequency or high halftone frequency and the zoom level is the low zoom level, an individual set of diffusion coefficients may be selected for each pixel (each current pixel).

FIG. 18 is an explanatory diagram showing another example of classification by the halftone frequency and zoom level. The example in FIG. 18 shows a case where the halftone frequency is classified into the low halftone frequency or high halftone frequency and the zoom level is classified into the low zoom level or high zoom level. As shown in FIG. 18, when the halftone frequency is the low halftone frequency, or when the halftone frequency is the high halftone frequency and the zoom level is the high zoom level, even if the current pixel is changed, the same set of diffusion coefficients may be selected, and when the halftone frequency is the high halftone frequency and the zoom level is the low zoom level, an individual set of diffusion coefficients may be selected for each pixel (each current pixel). The diffusion coefficients should just be selected based on a combination of the halftone frequency and zoom level so that an image quality deterioration of a halftone area is prevented and lowering of graininess thereof is controlled.

As explained above, according to the present invention, by selecting a set of diffusion coefficients according to the halftone frequency obtained based on a pixel value of an input image and the zoom level of the input image, the error diffusion process can be performed using optimal diffusion coefficients in consideration of not only the zoom level of the zoom process performed with respect to the input image, but also the halftone frequency included in the input image. Then, according to the degree of halftone frequency and the degree of zoom level, the diffusion coefficients suitable for reproduction of halftone are used, and the diffusion coefficients suitable for reproduction of a continuous tone image are used for an area in which halftone of an input image has blurred, thereby preventing an image quality deterioration of a halftone area, and controlling drop in graininess thereof.

The present invention is also applicable to not only a digital copying machine but also a digital color multi-function peripheral provided with a copy function, printer function, facsimile transmitting function, scan to e-mail function, etc. The digital color multi-function peripheral is also provided with a communication device which consists of a modem or a network card, for example. When sending facsimile, the modem performs a sending procedure with the other party, when a state that can be sent is secured, image data (image data read with a scanner) compressed in the predetermined format is read from a memory, is subjected to a required process, such as change of the compression format, and is sent to the other party sequentially via a communication line.

When receiving facsimile, the CPU receives image data sent from the other party while performing a communication procedure, and outputs the image data to the color image processing apparatus 10. The color image processing apparatus 10 performs the decompression process with respect to the received image data in a not-shown compression/decompression process section. The decompressed image data is subjected to a rotating process and a resolution conversion process, if necessary, is subjected to the output tone correction and tone reproduction process, and is formed on a sheet by the color image output apparatus 2 for output. The digital color multi-function peripheral can also perform data communication via a network card, a LAN cable, etc. with a computer or another digital complex machine which is connected to a network. Although in the above-mentioned example the color multi-function peripheral is explained, a monochrome multi-function peripheral can also applicable to the present invention.

Figure 19:
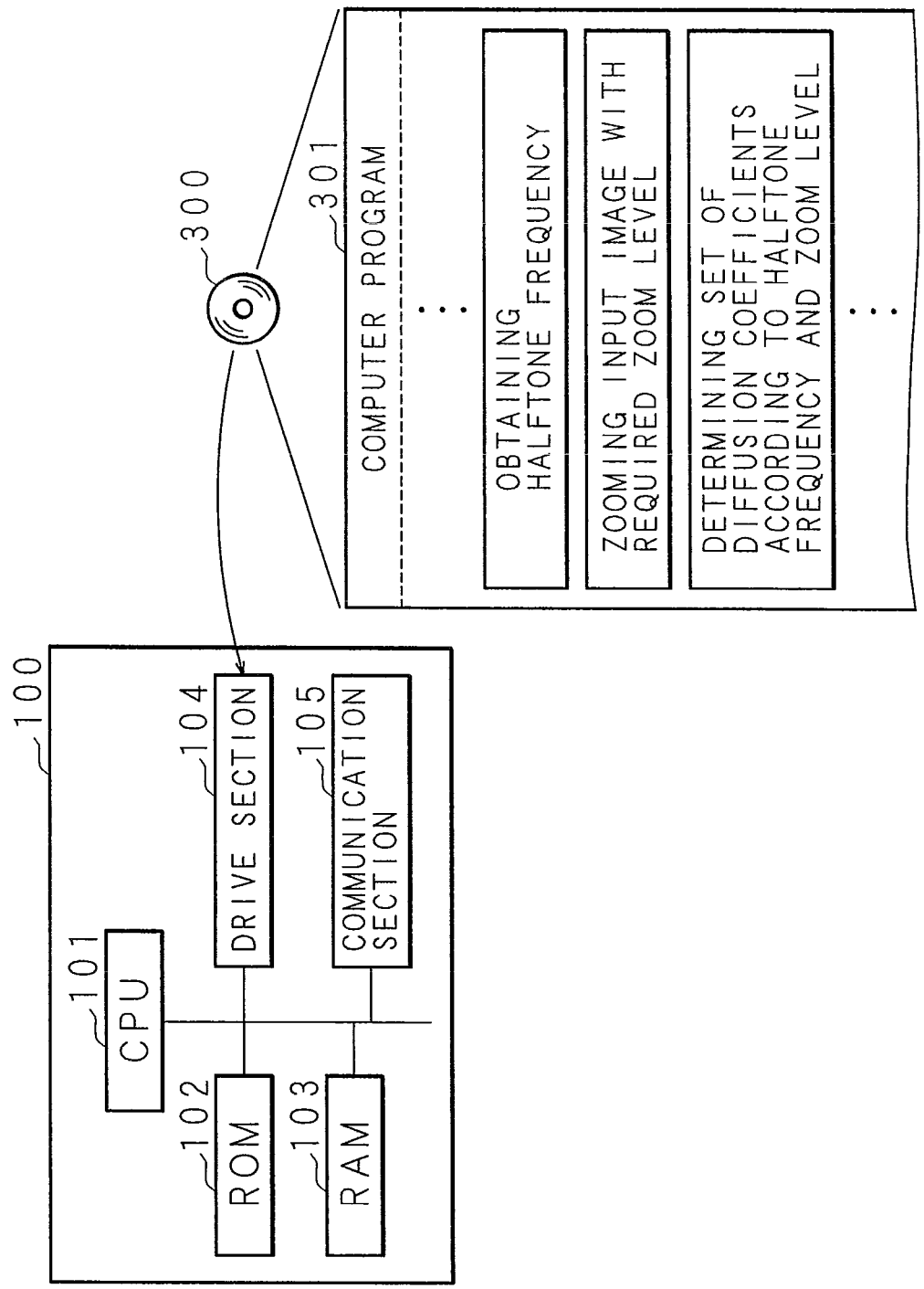
FIG. 19 is a block diagram showing an inner structure of the image forming apparatus provided with the image processing apparatus according to the present invention.

In the above-mentioned embodiment, the tone reproduction process section 22 and respective sections for performing the other processes which are provided in the image forming apparatus 100 can be also realized with software using a processor, such as the CPU. FIG. 19 is a block diagram showing an inner structure of the image forming apparatus provided with the image processing apparatus according to the present invention. Namely, the image forming apparatus 100 comprises a CPU (Central Processing Unit) 101 for executing an instruction of a control program 301 which realizes respective functions, a ROM (Read Only Memory) 102 for storing the above program 301, a RAM (Random Access Memory) 103 for developing the above program 301, a drive section 104 such as a CD-ROM drive for reading the above program 301 from a recording medium 300, and the like. The drive section 104 reads the recording medium 300 recording readable by the computer, program codes (an execute form program, an intermediate code program, a source program) of the control program 301 which are the software for realizing the above-mentioned functions, the read program 301 is stored in the ROM 102. The control program 301 is loaded into the RAM 103 from the ROM 102 as needed, and the CPU 101 causes the image processing apparatus 100 to execute a necessary process based on the loaded control program 301.

As the above-mentioned recording medium 300, for example, a tape system such as a magnetic tape, a cassette tape, etc., a disk system containing a magnetic disk, such as a flexible disk/hard disk, and an optical disk, such as CD-ROM/MO/MD/DVD/CD-R, a card system, such as an IC card (including a memory card)/optical card, or a semiconductor memory system, such as a mask ROM/EPROM/EEPROM/flash ROM, etc. can be used.

The image forming apparatus 100 may comprise a communication section 105, and may be constructed so as to connect with a communication network and supply the above-mentioned program codes via the communication network. The communication network is not particularly limited, and is available to, for example, the Internet, intranet, extranet, LAN, ISDN, VAN, a CATV communication network, Virtual Private Network VPN, a telephone network, a mobile communication network, a satellite communication network, etc. Moreover, a transmission medium which constructs the communication network is not particularly limited, and is available to, for example, a cable such as IEEE1394, USB, a power line carrier, a cable TV line, a telephone line, and an ADSL line, or wireless such as an infrared ray like IrDA or a remote control, Bluetooth (registered trademark), 802.11 wireless, HDR, a portable telephone network, satellite connection, and a terrestrial digital network or the like. Note that the present invention may be realized in a configuration of a computer-data signal which is embodied by electronic transmission with the above-mentioned program codes and is embedded in a carrier.

Each section of the image forming apparatus 100 may be constructed by not software but hardware logic. The hardware which performs a part of the process, and calculating means for executing software which performs control of the hardware and the other processes may be combined. A computer system of the present invention may comprise an image reading device, such as a flat-bed scanner, film scanner, digital camera, a computer by which the above-mentioned various processes are performed by loading a predetermined program, an image display device, such as a CRT display, a liquid crystal display, etc. for displaying a process result of the computer, and an image forming device, such as a printer etc. for outputting a process result of the computer to paper etc. Moreover, the computer system may comprise a network card, or a modem, etc. as communication means for connecting with a server etc. via a network.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus which quantizes a pixel value of each of a plurality of pixels contained in an input image, based on a quantization threshold, performs an error diffusion process of diffusing a quantization error generated by quantization to a neighborhood pixel of each pixel, and generates an output image of halftone, comprising:
    a storage section for storing a plurality of sets of diffusion coefficients for the error diffusion process;
    a halftone frequency obtaining section for obtaining a halftone frequency based on a pixel value of an input image;
    a zoom process section for zooming the input image with a required zoom level; and
    a process section for selecting an individual set of diffusion coefficients for each pixel or the same set of diffusion coefficients for each pixel from the sets of diffusion coefficients stored in said storage section, based on a combination of the halftone frequency obtained by said halftone frequency obtaining section and the zoom level with which the input image is zoomed by said zoom process section, and performing the error diffusion process based on the selected set of diffusion coefficients and the quantization error.

2. The image processing apparatus according to claim 1, wherein the process section:
    classifies the halftone frequency obtained by said halftone frequency obtaining section, based on a predetermined halftone frequency threshold;

classifies the zoom level of the input image zoomed by said zoom process section, based on a predetermined zoom level threshold; and selects a set of diffusion coefficients according to a combination of classification results.

3. The image processing apparatus according to claim 2, wherein said process section:

classifies the halftone frequency into a low halftone frequency, middle halftone frequency, or high halftone frequency, and classifies the zoom level into a low zoom level, middle zoom level, or high zoom level; and selects an individual set of diffusion coefficients for each pixel, when the halftone frequency is classified into the middle halftone frequency or high halftone frequency and the zoom level is classified into the low zoom level.

4. The image processing apparatus according to claim 2, wherein said process section:

classifies the halftone frequency into a low halftone frequency, middle halftone frequency, or high halftone frequency, and classifies the zoom level into a low zoom level, middle zoom level, or high zoom level; and selects the same set of diffusion coefficients for each pixel, when the halftone frequency is classified into the low halftone frequency, or when the halftone frequency is classified into the middle halftone frequency or high halftone frequency and the zoom level is classified into the middle zoom level or high zoom level.

5. The image processing apparatus according to claim 1, further comprising an area determination section for determining whether the pixel belongs to at least any one of a text area, halftone area, or photograph area, based on the pixel value of the input image, wherein said process section selects a set of diffusion coefficients according to a determination result by said area determination section.

6. An image forming apparatus comprising:

an image processing apparatus which quantizes a pixel value of each of a plurality of pixels contained in an input image, based on a quantization threshold, performs an error diffusion process of diffusing a quantization error generated by quantization to a neighborhood pixel of each pixel, and generates an output image of halftone; and an image forming section for forming an output image generated by said image processing apparatus on a sheet wherein said image processing apparatus comprises:

a storage section for storing a plurality of sets of diffusion coefficients for the error diffusion process;

a halftone frequency obtaining section for obtaining a halftone frequency based on a pixel value of an input image;

a zoom process section for zooming the input image with a required zoom level; and a process section for selecting an individual set of diffusion coefficients for each pixel or the same set of diffusion coefficients for each pixel from the sets of diffusion coefficients stored in said storage section, based on a combination of the halftone frequency obtained by said halftone frequency obtaining section and the zoom level with which the input image is zoomed by said zoom process section, and performing the error diffusion process based on the selected set of diffusion coefficients and the quantization error.

7. A non-transitory recording medium readable by a computer and recording a computer-executable program for causing a computer to quantize a pixel value of each of a plurality of pixels contained in an input image, based on a quantization threshold, perform an error diffusion process of diffusing a quantization error generated by quantization to a neighborhood pixel of each pixel, and generate an output image of halftone, said computer program comprising:

a step of causing a computer to obtain a halftone frequency based on a pixel value of the input image;

a step of causing the computer to zoom the input image with a required zoom level; and a step of causing the computer to determine an individual set of diffusion coefficients for each pixel or the same set of diffusion coefficients for each pixel based on a combination of the obtained halftone frequency and the zoom level with which the input image is zoomed, and perform the error diffusion process based on the determined set of diffusion coefficients and the quantization error.

8. An image processing method for an image processing apparatus which quantizes a pixel value of each of a plurality of pixels contained in an input image, based on a quantization threshold, performs an error diffusion process of diffusing a quantization error generated by quantization to a neighborhood pixel of each pixel, and generates an output image of halftone, the method comprising:

storing a plurality of sets of diffusion coefficients for the error diffusion process;

obtaining a halftone frequency based on a pixel value of an input image;

zooming the input image with a required zoom level; and selecting an individual set of diffusion coefficients for each pixel or the same set of diffusion coefficients for each pixel from the stored sets of diffusion coefficients based on a combination of the obtained halftone frequency and the zoom level with which the input image is zoomed, and performing the error diffusion process based on the selected set of diffusion coefficients and the quantization error.

* * * * *